Feb. 4, 1936.  A. L. LANGEL  2,029,535
MEANS FOR POACHING EGGS
Filed May 16, 1935
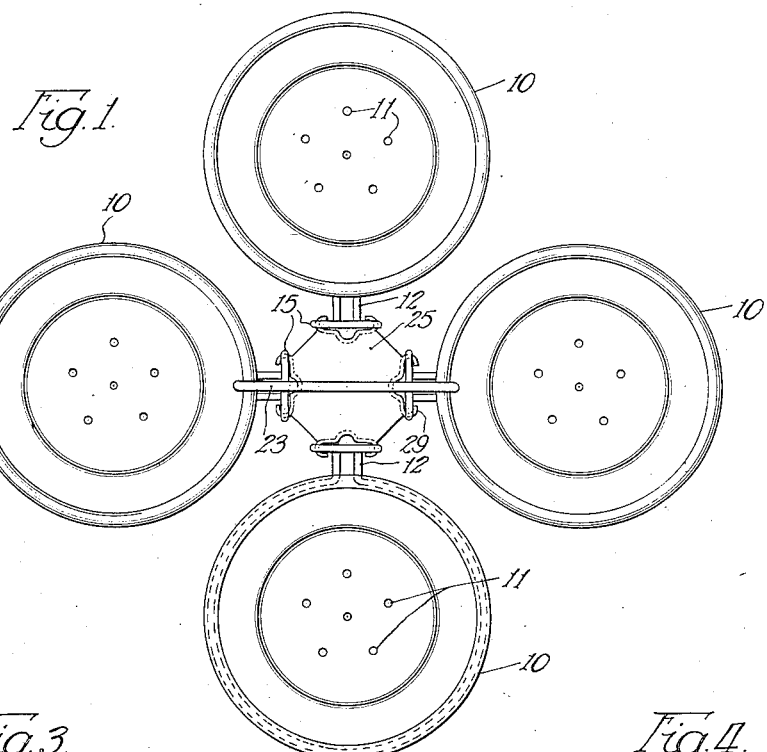
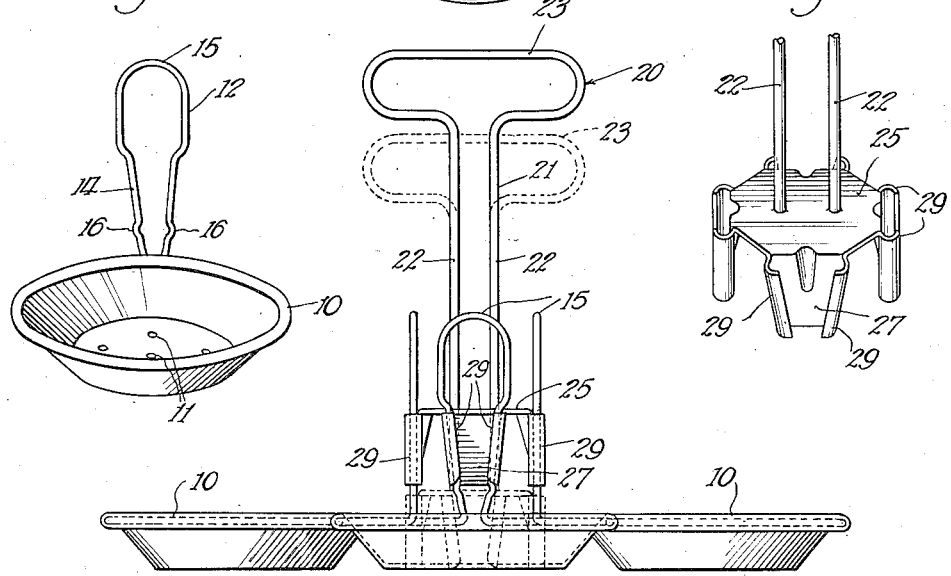
Inventor
Adrian L. Langel
By Zabel, Carlson & Wells
Attys.

Patented Feb. 4, 1936

2,029,535

UNITED STATES PATENT OFFICE 2,029,535

MEANS FOR POACHING EGGS

Adrian L. Langel, Chicago, Ill., assignor to Chicago Metallic Manufacturing Company, a corporation of Illinois Application May 16, 1935, Serial No. 21,794

6 Claims. (Cl. 53—1)

The invention relates to devices for poaching eggs and has, among its other objects, the provision of devices of the kind described which are of simple construction and are convenient to handle.

One form of the invention is embodied in a device for poaching eggs, which device comprises a plurality of dish-like receptacles adapted to hold the individual eggs during the poaching operation. Each of the receptacles is provided with a handle having a tapered or wedge-like portion adapted to engage a handle member which is common to all of the receptacles. The construction is such that after the completion of the poaching operation, the device may be placed upon a plate, or the like, and the handle common to all of the receptacles may be pushed downwardly to detach it from the receptacles. The receptacles may then be handled by means of their individual handles.

Other objects and advantages will become apparent as the following detailed description progresses, reference being had to the accompanying drawing, wherein—

Fig. 1 is a plan elevation of a device for poaching eggs, which device embodies one form of the invention.

Fig. 2 is a side elevation of the poaching device shown in Fig. 1.

Fig. 3 is a perspective view of one of a plurality of receptacles forming parts of the device shown in Figs. 1 and 2, and Fig. 4 is a fragmentary perspective view of a handle member which forms part of the device shown in Figs. 1 and 2.

Referring to the drawing wherein a preferred embodiment of the invention is illustrated, the reference character 10 designates a plurality of shallow dish-like receptacles which are preferably formed from sheet metal and are preferably provided with perforations 11 in their bottom walls. The upper edges of the receptacles 10 are preferably reenforced with wire forming part of handles 12, a handle 12 being provided for each receptacle 10. As indicated by dotted lines in Figs. 1 and 2, the sheet metal forming each receptacle 10 is folded over a portion of the wire forming the associated handle 12.

Referring to Fig. 3, it will be noted that the handles 12 project upwardly from the receptacles 10 and that the wire forming them flares outwardly to provide outwardly flaring or wedge-like portions 14 on the handles and that at the upper ends of the wedge-like portions 14 the wire is bent outwardly at a relatively sharp angle and is then formed into a loop-like portion 15 whereby the handle may be grasped. At the lower ends of the wedge-like portions 14, the wire is kinked or bent slightly as at 16. The purpose of this construction will presently appear.

Means is provided whereby the several receptacles 10 may be handled as a unit. This means preferably comprises a handle member 20 which comprises a wire 21. The wire 21 is preferably bent to provide vertically extending rods 22, the upper ends of which terminate in an integral loop-like member 23 whereby the handle may be grasped. The lower ends of the rods 22 are secured rigidly in a bracket 25 which is preferably formed from sheet metal and is provided with downwardly extending tapered portions 27 adapted to receive the wedge-like portions 14 of the handles 12. It will be noted that the tapered portions 27 are provided with flanges 29 adapted to receive and hold the wires forming the handles 12.

The receptacles 10 may be assembled with the handle 20 by dropping the wedge-like portions 14 into the tapered pocket-like portions 27 provided on the bracket 25, the handles 15 being pressed downwardly until the kinked or bent portions 16 of the handles 12 are disposed beneath the lower ends of the flange 29 (Fig. 2). The portions 16 then co-operate with the loop-like portions 15 of the handles 12 to prevent accidental displacement of the receptacles 10 relative to the handle member 20.

After the receptacles 10 have been assembled with the handle member 20 an egg may be broken in each of the receptacles in the usual manner and then poached. After the poaching operation, the device is preferably placed upon a plate, or the like, and the handle member 20 is urged downwardly so that the pocket-like portions 27 of the bracket 25 are disengaged from the wedge-like portions 14 of the handles 12. This operation is illustrated in dotted lines in Fig. 2. The receptacles 10 may then be handled individually by their handles 12.

I claim:

1. A device of the kind described comprising a plurality of receptacles, an individual handle for each receptacle, each individual handle being formed with a tapered portion, and a handle common to all of said receptacles and having tapered pocket-like portions for detachably holding the tapered portions of said individual handles.

2. A device of the kind described comprising a plurality of receptacles adapted to rest upon a plane surface, an individual handle for each of said receptacles, said individual handles being formed with tapered portions, and a handle common to all of said receptacles and having tapered pocket-like portions for detachably holding the tapered portions of said individual handles, said tapered portions of said individual handles and said tapered pocket-like portions being disposed so that said pocket-like portions of said common handle will be disengaged from said tapered portions of said individual handles when said common handle is pushed downwardly while said receptacles are resting on said plane surface.

3. A device of the kind described comprising a plurality of receptacles adapted to rest upon a plane surface, an individual handle for each of said receptacles, a handle common to all of said receptacles and having means for detachably holding said individual handles whereby said common handle may be employed to lift said receptacles from said plane surface, said common handle being detachable from said receptacles when it is pushed downwardly while said receptacles are resting on said plane surface.

4. A device of the kind described comprising a plurality of receptacles adapted to rest upon a plane surface, an individual handle for each of said receptacles, and a handle common to all of said receptacles and frictionally engageable with said individual handles, said common handle being disengageable from said individual handles when it is pushed downwardly while said receptacles are resting on said plane surface.

5. A device of the kind described comprising a plurality of receptacles adapted to rest upon a plane surface, an individual handle for each of said receptacles, and a handle common to all of said receptacles and frictionally engageable with said individual handles, said individual handles having means limiting displacement of said common handle along said individual handles in one direction, said common handle being disengageable from said individual handles when said common handle is pushed downwardly while said receptacles are resting on said plane surface.

6. A device of the kind described comprising a plurality of receptacles adapted to rest upon a plane surface, an individual handle for each of said receptacles, said individual handles being formed with tapered portions, and a handle common to all of said receptacles and having means for frictionally engaging said tapered portions of said individual handles, said tapered portions being disposed so that said common handle will be disengaged from said tapered portions when said common handle is pushed downwardly while said receptacles are resting on said plane surface.

ADRIAN L. LANGEL.